May 25, 1937.     S. C. CARNEY     2,081,322
PROCESS AND APPARATUS FOR CONDUCTING CHEMICAL REACTIONS
Original Filed Oct. 8, 1930
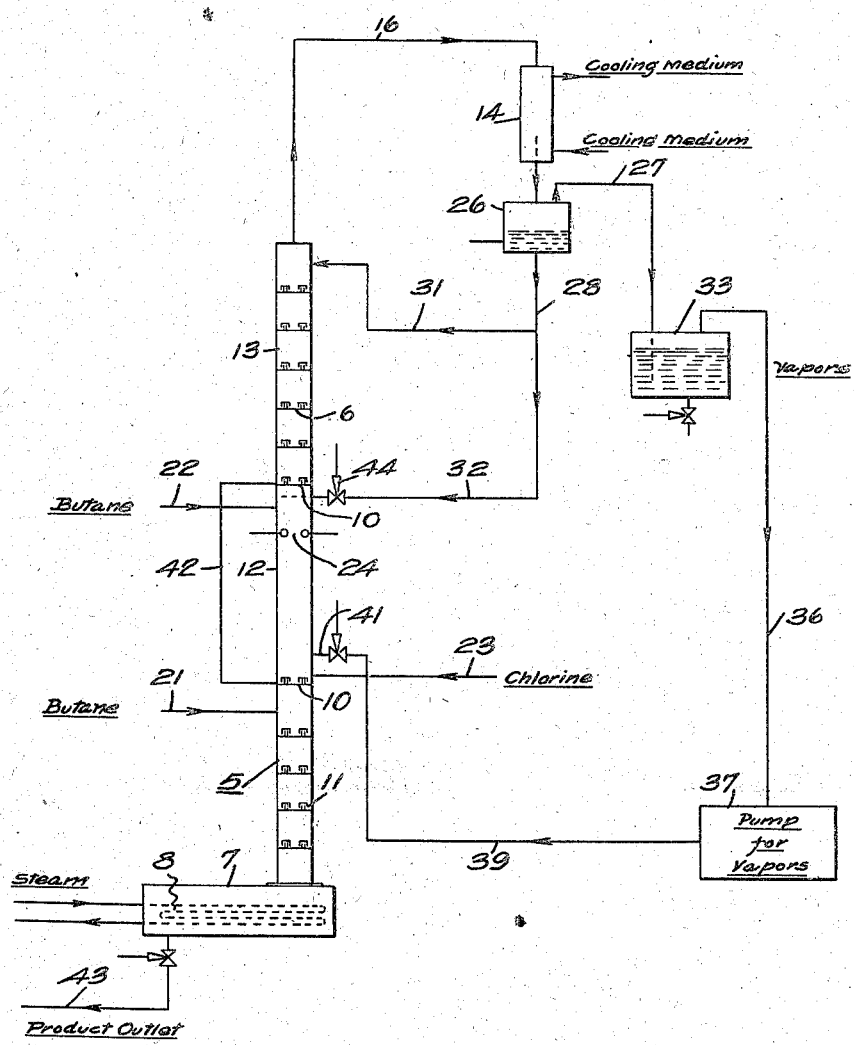
INVENTOR:
Samuel C. Carney
BY
ATTORNEY.

Patented May 25, 1937

2,081,322

UNITED STATES PATENT OFFICE 2,081,322

PROCESS AND APPARATUS FOR CONDUCTING CHEMICAL REACTIONS

Samuel C. Carney, Berkeley, Calif., assignor to Shell Development Company, San Francisco, Calif., a corporation of Delaware Application October 8, 1930, Serial No. 487,196
Renewed August 19, 1935

13 Claims. (Cl. 23—263)

My invention relates in general to a method of conducting chemical reactions in a continuous manner, between reagents which are themselves, or the products of which are susceptible of rectification relative to each other. The invention consists in conducting such reactions in a rectifying column, whereby rectification is used to maintain the most desirable conditions for the reaction.

Chemical and physical processes are often, particularly in industry, considered to be quite different, and as having little or no relation with each other, and accordingly plants are built and processes conducted in such way as to keep the chemical and physical steps separated in the process of manufacturing. Chemical processes are in the main still conducted either as a batch or continuously in autoclaves or other simple vessels, which not only do not provide for, but as a rule preclude the use of the advantageous physical factors which I utilize.

On the other hand the process and methods of rectification are employed for the physical separation of mixtures of fluids of different boiling points. By rectification I mean any process in which components of such mixtures are separated by distillation by means of direct physical contact and heat exchange between ascending vapors and descending reflux liquid in any kind of a rectifying column, usually provided with plates or packing. Such entirely physical rectifying processes are used in the manufacture of benzol, alcohol, natural gasoline, etc.

I have found that the principles and methods of rectification can be used to great advantage in the conducting of many chemical reactions, mainly because this makes possible a close and simple maintenance of the most favorable reaction conditions; to obtain such control is the greatest difficulty in a number of chemical processes. As is well known, for most chemical reactions there are rather narrow limits of temperature, pressure and concentration under which reactions progress most satisfactorily, but usually after starting the reaction under these optimum conditions, the progress of the reaction itself tends to change the conditions in such a manner that the reaction slows down or takes an undesirable course. This change of conditions is due to, firstly, the presence of reaction products in the reaction zone; secondly, to the liberation or absorption of heat in the formation of the product, changing the temperature in the reaction zone, and thirdly, to the diminishing concentration of the reacting materials during the progress of the reaction.

These difficulties are solved in a very simple way by my invention: the use of a rectifying column for such reactions allows the continuous and immediate withdrawal of the products of reaction from the reaction zone. Further, evaporation of liquid introduced in the reaction zone in direct contact with the reagents gives a means of perfect control of temperature in the reaction zone for exothermic reactions. This obviates all the difficulties with cooling jackets, tubes and such arrangements used in present plants. The use of a rectifying column also permits immediate removal of the liquid and vaporous products, and return of unused reagents to the reaction zone, while restricting the reaction to that zone, where optimum conditions of concentration and temperature are maintained. Hereby undesirable secondary reactions are prevented as well in the reaction zone as after withdrawal of unused reagents or reactive products.

For several reactions I have found that the establishing of the reaction zone in a rectifying column has great advantages in yield and quality of product over present methods in which the reaction and the separation of the products are conducted separately. My invention can be advantageously applied to such reactions as oxidation, chlorination, esterification, saponification, oxidation of sulfur dioxide, absorption with acids, as sulfuric acid, sulfonation, nitration, ammonia synthesis, and many other reactions where reagents or products can be separated from each other by rectification. Catalysts may be used if desirable, and can be provided in the reaction zone, at predetermined points, most favorable to the reaction.

The only limits for the process of my invention are those imposed by the technical possibilities of rectification, which at present is practised as far as pressure is concerned, between a high vacuum and a pressure of 300–400 lbs. and between temperatures of —40° F. to 600° F.

Further features and advantages of my invention will appear from the following description. It will be understood that I do not limit myself to the particular details of any specific application of my invention, but I extend my claim for the principle thereof in scope and equivalents as far as the state of the prior art will allow.

In all chemical reactions there exists at every relation of temperature, pressure and concentration of reagents and products, both either in the liquid or vapor phase, a certain condition of equilibrium, not only physical but also chemical between the reagents and products towards which the reaction develops. Even when very little is known about such equilibria, the general laws of mass action and the law of Le Chatelier enable us to predict the direction in which the equilibrium will be changed after certain changes in the conditions. For example, if a reaction is accompanied by a decrease in volume, and in the production of one product the decrease is greater than in the production of another, an increase in pressure will result in increased production of the first product with the greatest decrease in volume.

Further, in many cases where liquid and gaseous reagents are used the removal of products of reaction by rectification permits the continuous maintaining of a desirable "thermodynamic potential" analogous, for example, to that in a mixture of the water solutions of calcium chloride and sodium carbonate. When these two solutions are mixed the water-insoluble calcium carbonate continuously separates out from the solution resulting in a much higher yield thereof than if it were soluble in the water. Products whose yield it is desired to minimize may be intentionally reintroduced to the active zone if the rectification tends to remove them and their production may thus be controlled.

In many reactions the first or primary product is more active with one of the reagents, than is the other reagent. For this and other reasons it is desirable to remove the primary product from the reaction zone as quickly as formed; this also prevents slowing down of the reaction by an increase in the relative quantity of the primary product present in proportion to the reagents.

In all such cases the use of a rectifying column containing the reaction zone, according to my invention, allows the maintenance of the optimum conditions in the reaction zone for the desired reaction by the simple control it affords over temperature, pressure and concentrations.

The control of the temperature I obtain as mentioned above, by the injection of a suitable liquid directly into the reaction zone. In exothermic reactions, unless heat is removed the temperature will rise too high. The pressure will also rise and this increase can conveniently be used to automatically inject a vaporizable liquid into the reaction zone, which will evaporate and thereby sufficiently dissipate the surplus of heat, and maintain a state of both chemical and physical equilibrium in the reaction zone. The reaction will be restricted to the reaction zone, as only there the proper conditions for reaction exist, and excluded from the zones for rectification of the products. The liquid so introduced may be a reagent or a product, preferably undesirable, or it may be inert in regard to the reaction.

By rectifying column for this purpose is meant a column or series of columns either packed or provided with plates, constructed of such materials as will stand the action of the reagents and products of the chemical reaction and modified as to size of its parts, spacing of plates or packing, number of plates or amount of packing in its various sections, to suit the chemical nature of the materials and the requirements of the reaction, while at the same time retaining the necessary construction to permit the desired rectification,—having in mind the physical characteristics of the reacting materials and their products. According to these characteristics and the nature of the reaction—whether accompanied with a decrease or an increase in volume, etc.—the position and size of the reaction zone in the column will have to be determined, the lengths of the rectifying sections, and many other points of construction. If the desired product is heavier than the reagents, it will have to be taken off as a liquid from the bottom, while lighter products will come off at the top. These are all constructional variations on the principle of my invention, as demanded by the particular case.

As an example I will first describe the application of my invention to the chlorination of butane. It will be understood that these reactions are examples only and that I do not confine my invention to these nor to any of the particular features described here.

The chlorination of butane may be carried out with the butane in either liquid or vapor phase and either with or without a catalyst; it is known to be promoted by actinic light rays and by the presence of a small amount of water. The reaction is exothermic; the products may include all the possible chlorides; under certain conditions, as in the presence of an excess of chlorine, the reaction may proceed with explosive violence. The purpose of this reaction is to obtain butylmonochloride, which can be used as a base for numerous other reactions; the production of higher chlorides, as butyl-di or tetra-chloride is quite undesirable, because of the higher consumption of chlorine and greater production of HCl as side product. The reaction always produces a certain amount of the more highly chlorinated products, but this can be minimized by operation in the presence of a large excess of butane.

The butyl chlorides are of much higher specific gravity and lower vapor pressure than butane and chlorine; HCl is not far different from chlorine in these respects. Butane is very soluble in the chlorides.

The attached drawing illustrates more or less diagramatically a rectifying column which is arranged for the application of my invention to the chlorination of butane; this is again only given as an example without limiting myself. This apparatus consists mainly of: a rectifying column 5 with plates 6, divided into three sections, a middle section 12, the reaction zone, and upper and lower rectifying zones 13 and 11, a reflux condenser 14 and a reboiler kettle 7. Further a gas separator 26, and HCl absorber 33 and a vapor circulating pump 37.

The operation of this apparatus is as follows: butane is introduced as a liquid or vapor through pipe 21 and/or 22 as desired, chlorine through pipe 23. The position of these pipes I have found to be most advantageous as shown, 21 under the top plate of lower section 11, inlet 22 in the top of the reaction zone 12, and pipe 23 at the bottom of the reaction zone. The reference 24 indicates a suitable number of quartz lamps generating actinic light. The proportion of butane and chlorine is so regulated that the partial pressures are those required by the chemistry of the reaction. The vapors evolved in the reaction zone 12 will rise into the rectifying section 13 which is provided with rectifying plates of the usual type, 6. The actinic light is prevented from penetrating this section by the bottom plate 10. In this section all of the chlorides which happen to escape from the reaction zone, are condensed and returned to the reaction zone, together with part of the unreacted butane. From the top of the column the uncondensed vapors, consisting of a mixture of chlorine, HCl, and butane are passed through pipe 16 to reflux condenser 14. The temperature here is so regulated by means of a cooling medium that all butane in the mixture will condense. The mixture of vapor and liquid passes on to separator 26, from which the liquid butane is taken off through 28 and returned to the column, either through the usual reflux line 31 or through line 32 and valve 44 leading into the reaction zone, which constitutes a special feature of my invention. The uncondensed chlorine and HCl pass through 27 to absorber 33 where the HCl is absorbed in preference by a suitable solvent, as water, which will leave the chlorine. This chlorine is reintroduced into the column by pump 37, through 36, 39, and valve 41, near 23, the inlet for the fresh chlorine. The liquid products formed in the reaction zone 12 descend along the plates in section 11; the top plate 10 prevents the reaction to continue in this section by excluding the catalyzing actinic light. At the bottom of this lower rectifying section the liquid passes into the reboiler 7, equipped with heating means, as a steam coil 8; the product is drawn off through 43. In the lower section and the kettle the butane and chlorine, which may have dissolved in the heavier chlorides, are vaporized and removed, so that only chlorides will be drawn off. If it is desired to avoid the presence of reflux liquid in the reaction zone, the reflux in the bottom plate 10 of upper section 13 is by-passed through 42 into the top plate 10 of lower section 11.

From this description the advantages of conducting this reaction in a rectifying column will be clear. In the reaction zone the exact conditions most favorable to the chlorination can easily be established and maintained, the product formed is immediately removed from the reaction zone, before the butyl monochloride has much opportunity to react instead of the butane with the chlorine, and form the undesirable higher chlorides. The upper section together with the reflux condenser prevent the chlorides produced from remaining dissolved in the reagents, and return thereafter the purified unused reagents to the reaction zone. The lower section together with the reboiler purify the product, and prevent any reagent to remain dissolved therein. From known principles of rectification it is possible to calculate for each reaction the required length of each section, the number and size of plates, or amount of packing, so that the rectification is accomplished to the needed extent. The heating in the reboiler and cooling in the reflux condenser are regulated accordingly.

Another special feature of my invention is the maintaining of the temperature of the reaction zone by means of the regulated introduction of a liquid vaporizable at the conditions in the reaction zone. In the present example of my invention I introduce liquid butane into the reaction zone. Preferably I use reflux liquid from reflux condenser 14. This may be done through valve 44 which may be automatic and actuated by pressure. The chlorination reaction is exothermic and unless heat is removed the temperature of the reaction zone will become too high. A rise of temperature will be accompanied by a rise in pressure, which will actuate valve 44, allowing a certain quantity of liquid butane to enter the reaction zone; the evaporation hereof will immediately remove the surplus of heat and the temperature and pressure will decrease, closing the valve. In practice it is desirable to have this valve always open to a certain extent, so that there is always some liquid butane present in the reaction zone. The vapor of this butane will of course participate in the reaction, as also the chlorine returned through 41.

The total pressure in the reaction zone can be regulated to some extent by the temperature of the reflux condenser, which temperature can be fluctuated by an increase or decrease in the amount of cooling medium. In this way the pressure most suitable for the particular column and reaction can be maintained; the partial pressures of butane and chlorine can be regulated to a certain extent by the introduction of smaller or larger quantities of the reagents, and by more or less refluxing of butane and recirculating of chlorine; this gives the arrangement of my invention great flexibility in operating.

As another example of a reaction to which my invention may be applied, I may mention the production of sulfuric esters by the absorption of propylene in sulfuric acid. For this reaction I preferably use a column provided with packing which is acid-resistant. Liquid propylene and liquid sulfuric acid are intimately contacted in the reaction zone, which may be partly filled with a continuation of the packing from the rectification zones. This reaction too is exothermic, and the temperature in the reaction zone can be controlled by the introduction of liquid reflux, consisting of propylene. The sulfuric ester is withdrawn from the reboiler.

As the heat developed during this reaction is more than that during the chlorination of butane, I prefer to locate the reaction zone higher in the column, at a relatively cooler position, and increase the size of the reflux condenser. I prefer to use liquid propylene, as a reagent, as a more intimate contact can be obtained with the liquid sulfuric acid. The pressure must not be so high that vaporization of the propylene is prevented. As the other reagent, the sulfuric acid, will not vaporize to any considerable extent, no arrangement will be necessary for recirculation.

Similar changes will have to be made to adapt my invention to other reactions, but once the desired conditions for the reaction are known, a column for operation of such reaction, according to the principles of my invention, can be designed.

I claim as my invention:

1. A chemical system in which chemical reactions are conducted in a continuous manner, comprising: a rectifying column provided at the top with refluxing means and at the bottom with heating means, a chemical reaction zone in this column, so situated that rectification will take place both above and below this reaction zone, means to introduce chemically reactive fluids into the column and pressure responsive means to introduce thermally responsive fluids directly into the reaction zone.

2. A chemical system adapted to continuously execute chemical reactions comprising a rectifying column containing a plurality of rectifying units and a reaction unit, and pressure responsive means adapted to regulate the temperature in the reaction unit within predetermined conditions said means being directly in communication with the reaction unit.

3. A chemical system as described in claim 1 combined with means to reintroduce a regulated quantity of condensate from the reflux condenser 4. An apparatus for use in continuous chemical reactions which comprises a rectifying column which contains a reaction zone wherein substantially no rectification can take place, a condensing system in communication with said column whereby vapors leaving said column may be condensed, and means communicating between the condensing system and the reaction zone whereby the condensate may be introduced directly into said reaction zone.

5. A process of conducting chemical reactions in a continuous manner in a rectifying column having a reaction zone and wherein rectification can take place both above and below the reaction zone, which process comprises bringing together in the reaction zone, in the fluid state, reactants which will produce a product of substantially higher boiling point than that of the reactants, causing the reaction to take place, regulating the temperature and pressure in the reaction zone so as to cause at least one of the reactants in the reaction zone to move toward the top of the column in the vaporous state and the reaction product to move toward the bottom of the column in the liquid state, causing the desired reaction product to leave the reaction zone substantially as soon as formed and rectifying at least part of such fluid after leaving the reaction zone.

6. A process as described in claim 5, in which the temperature of the reaction is controlled by the reintroduction of a regulated quantity of a condensate of the system which left the reaction zone in a vaporous condition, directly into the reaction zone in intimate contact with the reactants therein.

7. A process as described in claim 5, in which the temperature of the reaction is controlled by the reintroduction of a regulated quantity of a condensate of the system, which left the reaction zone in vaporous condition, directly into the reaction zone in intimate contact with the reactants therein and in which process the regulation of said quantity of the condensate takes place in response to pressure variations in the reaction zone.

8. A process of conducting a halogen reaction in a continuous manner in a rectifying column having a reaction zone and wherein rectification can take place both above and below the reaction zone, which process comprises bringing together in the reaction zone, in the fluid state, halogen and another reactant which will produce a halogenated product of substantially higher boiling point than that of the reactants, causing the reaction to take place, regulating the temperature and pressure in the reaction zone so as to cause at least one of the reactants in the reaction zone to move toward the top of the column in the vaporous state and the halogenated reaction product to move toward the bottom of the column in the liquid state, causing the desired halogenated reaction product to leave the reaction zone substantially as soon as formed, and rectifying at least part of such fluids after leaving the reaction zone.

9. A process of conducting chemical reactions in a continuous manner in a rectifying column having a reaction zone and wherein rectification can take place both above and below the reaction zone, which process comprises bringing together in the reaction zone, in the fluid state, free halogen and hydrocarbon which will produce a halogenated hydrocarbon of substantially higher boiling point than that of the reactants, causing the reaction to take place, regulating the temperature and pressure in the reaction zone so as to cause at least one of the reactants in the reaction zone to move toward the top of the column in the vaporous state and the halogenated hydrocarbon to move toward the bottom of the column in the liquid state, causing the halogenated hydrocarbon to leave the reaction zone substantially as soon as formed, and rectifying at least part of such fluids after leaving the reaction zone.

10. A process as described in claim 5, in which the temperature in the reaction zone is controlled by directly introducing therein, into intimate contact with the reactants, a regulated quantity of a fluid capable of undergoing a change of state under the reaction conditions prevailing therein without substantially adversely affecting the course of the reaction.

11. A process as described in claim 5, in which the temperature in the reaction zone is controlled by directly introducing therein, into intimate contact with the reactants, a regulated quantity of a liquid capable of vaporizing under the conditions of temperature and pressure prevailing therein without substantially adversely affecting the course of the reaction.

12. A process as described in claim 5, in which the temperature in the reaction zone is controlled by directly introducing therein, into intimate contact with the reactants, a regulated quantity of a liquid capable of vaporizing under the conditions of temperature and pressure prevailing therein and which is chemically inert under the prevailing reaction conditions.

13. A process as described in claim 5, in which the temperature in the reaction zone is controlled by at least periodically directly introducing and maintaining therein, in intimate contact with the reactants, one of the reactants in the liquid state, said latter reactant maintaining the reaction temperature substantially constant through vaporization.

SAMUEL C. CARNEY.